United States Patent Office 3,535,335
Patented Oct. 20, 1970

3,535,335
ISOINDOLINO-SULPHONYLUREA COMPOUNDS
Laszlo Beregi, Boulogne, Pierre Hugon, Rueil Malmaison, and Jacques Duhault, Chatou, France, assignors to Societe en nom Colleclif Science Union et Cie, Societe Francaise de Recherche Medicale Suresnes, France, a French society
No Drawing. Filed July 30, 1968, Ser. No. 748,628
Claims priority, application Great Britain, Aug. 10, 1967, 36,807/67
Int. Cl. C07d 27/48
U.S. Cl. 260—326.1                                3 Claims

ABSTRACT OF THE DISCLOSURE

N-[4 - ($\beta$ - 2' - methoxy-benzamido-ethyl)-benzene-sulfonyl]-N'-(2-isoindolino)-urea, optionally substituted on the benzamido radical by chlorine. These compounds possess hypoglycemic properties.

---

The present invention provides isoindolino sulfonylureas of general Formula I:

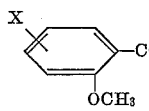—CO—NH—CH$_2$—CH$_2$—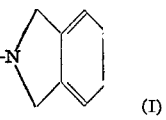—SO$_2$—NH—CO—NH—N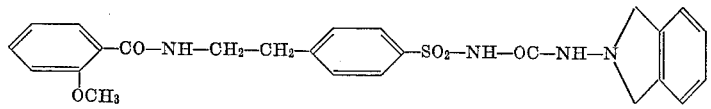

(I)

wherein X represents a hydrogen or chlorine atom.

The invention also includes the addition salts of the above compounds with suitable acids or bases. Among the acids that may be used, there may be mentioned, for example, hydrochloric, hydrobromic, sulfonic, acetic, malonic, maleic, fumaric, tartaric and malic acids. The bases include, for example, alkali metal hydroxides, alkaline earth-metal hydroxides, amino-alcohols such, for example, as 1-amino - 2 - propanol, 2-amino-2-methyl-1-propanol and choline.

The N-arylsulfonyl-N'-(2-isoindolino) ureas of the present invention can be prepared by reacting an arylsulfonyl-ethyl urethane of general Formula II:

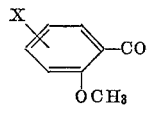—CO—NH—CH$_2$—CH$_2$—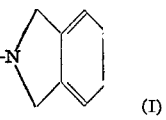—SO$_2$—NH—COO—C$_2$H$_5$ (II)

wherein X has the values previously defined, with an N-amino-isoindoline, according to the process disclosed by Marshall et al., J. Org. Chem. 23, 927 (1958).

These new compounds and their physiologically tolerable addition salts possess interesting therapeutic properties, especially hypoglycemic properties, and may be used as medicaments, for example, in the treatment of diabetes. The compounds may be used as such or in the form of pharmaceutical preparations which comprise a compound of the general formula in admixture or conjunction with a pharmaceutically suitable carrier.

The toxicity of these new compounds is very low. No mortality was noted for 48 hours when administered per orally in mice at doses of 3 g./kg.

The blood sugar lowering activity was shown in the rat and the rabbit. It was noted that the minimal active dose by oral route varies from 1 to 2.5 mg./kg. A lowering of 38% of the blood sugar is obtained with a dose of 5 mg./kg. in the rabbit and of 65% in the rat with 10 mg./kg. The action of these new compounds is especially long from 20 to 24 hours.

In comparison, tolbutamide, an antidiabetic well known and widely used in human patients, produces at a dose of 25 mg./kg. in the rabbit a reduction of only 19% of the blood sugar, and 50 mg./kg. are needed to obtain a blood sugar reduction of 23% in the rat for a duration not exceeding 15 hours.

The new compounds may be used in human therapy in the treatment of diabetes mellitus at a dose of about 10 to 200 mg., preferably 25 to 75 mg., 1 to 3 times per day. They can be administered per oral, rectal or parenteral route, but preferably p.o. The usual pharmaceutical carriers, as for example, talc, starch, lactose and magnesium stearate are used for the different pharmaceutical forms, such as tablets, dragees, etc. The tolerance of the products is good and no notable side effect is observed.

The following examples illustrate the invention; all parts are given by weight, and melting points are determined by the Kofler test unless otherwise stated.

EXAMPLE 1

N[4-($\beta$-orthomethoxy-benzamido-ethyl)-benzene-sulfonyl]-N'-(2-isoindolino)-urea

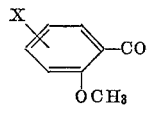—CO—NH—CH$_2$—CH$_2$—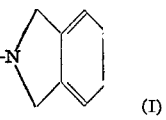—SO$_2$—NH—OC—NH—N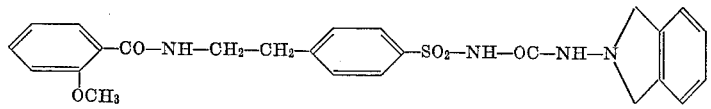

To 4 parts of N-[4-($\beta$-orthomethoxy-benzamido-ethyl)-benzenesulfonyl]-ethylurethane, melting at 153° C. ethanol, prepared from N-[4 - ($\beta$-ortho-methoxybenzamido-ethyl) benzene-sulphamide] and ethyl chloroformate in the presence of K$_2$CO$_3$ using acetone as solvent, and 60 parts of toluene, there are rapidly added 1.8 part of N-amino-isoindoline in 10 parts of dioxan. The reaction mixture is heated under reflux for 0.5 hour. The resulting clear solution crystallizes on cooling. The crystals are filtered, washed with 1 part of toluene, then recrystallized from anhydrous ethanol. There are obtained 3 parts of N-[4 - (β - orthomethoxybenzamido-ethyl)-benzenesulfonyl]-N'-(2-isoindolino) urea melting at 166° C., and according to the micro Kofler test, at 151–153° C.

EXAMPLE 2

N-[4-(β-2'-methoxy-5'-chloro-benzamido-ethyl)-benzenesulfonyl]N'-(2-isoindolino)-urea

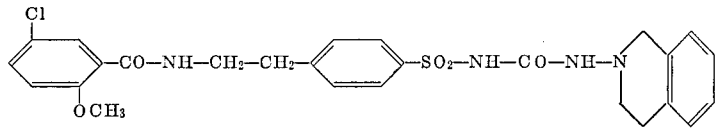

M.P. 172–174° C., M.P. micro Kofler 164–166° C. (methanol), prepared according to the process described in Example 1, starting from N-amino-isoindoline and N-[4-(β-2'-methoxy - 5' - chloro-benzamidoethyl)-benzenesulfonyl]-ethyl urethane.

Analogous compounds, having the chlorine atom in different positions on the benzene ring of the benzamido-ethyl radical, such as the 2'-methoxy-3',4', or 6'-chloro-benzamido-ethyl compounds, are prepared in the same manner, but starting from the appropriately substituted N-[4-(β-benzamidoethyl)-benzenesulfonyl] - ethyl urethane.

Various modifications and equivalents will be apparent to one skilled in the art and may be made in the compounds, compositions, and methods of the present invention without departing from the spirit of scope thereof, and it is therefore to be understood that the invention is to be limited only by the scope of the appended claims.

What we claim is:
1. A compound selected from the group consisting of (A) isoindolino sulfonylurea compounds of Formula I

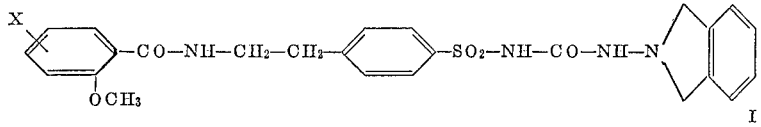

wherein X is selected from the group consisting of hydrogen and chlorine, and (B) physiologically acceptable addition salts thereof with acids or bases.

2. A compound of claim 1 which is N-[4-(β-2'-methoxy-benzamido-ethyl)-benzenesulfonyl]-N' - (2 - isoindolino)-urea.

3. A compound of claim 1 which is N-[4-(β-2'-methoxy-5' - chloro-benzamido-ethyl)-benzenesulfonyl]-N' - (2-isoindolino)-urea.

References Cited

UNITED STATES PATENTS 3,475,450  10/1969  Kabbe et al.

ALEX MAZEL, Primary Examiner

J. A. NARCAVAGE, Assistant Examiner

U.S. Cl. X.R.

260—470; 424—274